July 14, 1964 H. OPOTOW ETAL 3,140,958
COMPOSITION FOR PROTECTING THREADED ELEMENTS OF CONDUIT BOXES
Filed June 2, 1961

INVENTORS
Harold Opotow and
Herbert Ginsburg
BY
A. Stephen Baker
ATTORNEY 3,140,958
COMPOSITION FOR PROTECTING THREADED
ELEMENTS OF CONDUIT BOXES
Harold Opotow, 400 Howard Ave., Woodmere, N.Y., and
Herbert Ginsburg, Woodmere, N.Y. (108—20 180th
St., Jamaica 33, N.Y.)
Filed June 2, 1961, Ser. No. 114,538
2 Claims. (Cl. 117—6)

This invention relates to conduit boxes including switch boxes and outlet boxes used in electrical installations, and more particularly to means for protecting the conventional threaded connection holes or other threaded elements thereof from contamination by an outside substance, e.g., a plastering substance such as plaster, concrete, or cement.

In the construction of buildings or the like, conduits are arranged as necessary, electrical conductors are disposed therethrough and conduit boxes are placed at the ends of the conduits so that such ends may be connected to electrical switches, outlets, or fixtures which are secured to the conduit box. In many cases, wall surfacing in the form of plaster is put around the conduit box which is recessed in the wall. As is understood, such conduit boxes are generally provided with ears or lugs having threaded openings to which the above switches, outlets, or fixtures may be connected. A serious problem in installations such as above described, is the frequent entrance of plaster into such threaded openings so as to clog the same making it difficult for the electrician to mount the accessory thereto.

In order to overcome this difficulty, the art has generally applied temporary covers or sleeves which fit over the lugs so as to prevent their openings from becoming contaminated by the plaster. Objections thereto are the expense of providing such covers, the likelihood that they become displaced or lost during or before plastering, and the fact that plaster may nevertheless creep under the covers so as to penetrate and contaminate the openings. In addition such conduit boxes often have metal covers, which are referred to in the trade, as plaster covers. These also have openings which require protection from plaster contamination.

With the foregoing in mind, we have devised a means whereby all the above difficulties may be eliminated. Specifically, we have compounded a thermoplastic, waxlike substance which may be simply daubed or painted on a lug so as to completely fill the threaded opening. The composition is of such a nature that it will adhere firmly to the metal of which the conduit box is made. When the composition hardens, it nevertheless remains soft enough so that a screw may be directly screwed into the threaded opening without requiring removal of the composition.

The composition is such as to reject or prevent adherence of the plaster or concrete thereto. Accordingly, even should plaster be carelessly, as is usual, disposed against the opening thus protected, no plaster will adhere and the opening will be visible and free for connection of the fixture thereto. The screw need simply be applied right through the compound and into the opening, the composition even serving as somewhat of a lubricant at this time. We also preferably, but not necessarily, use a coloring substance so that the composition coated lug or the like will be more readily apparent to the electrician.

The invention will be further understood from the following description and drawings in which.

Figure 1:
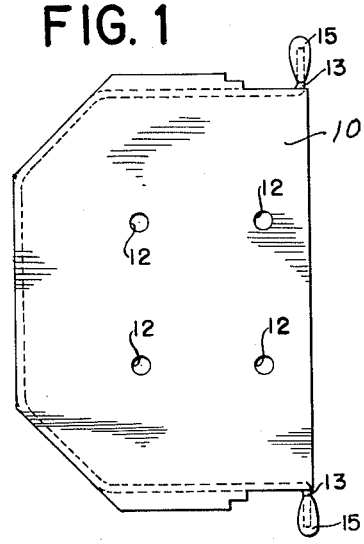
FIGURE 1 is a side elevational view of a conduit box with the compound of this invention applied to the connection lugs thereof.
Figure 2:
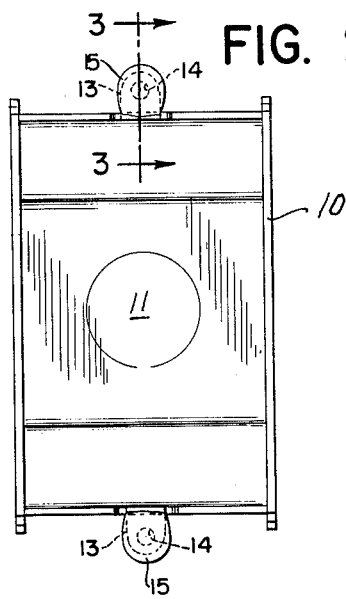
FIGURE 2 is a front elevational view thereof.
Figure 3:
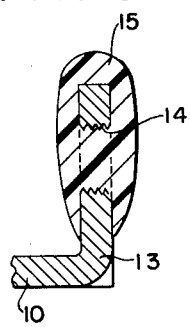
FIGURE 3 is an enlarged, fragmentary cross-sectional view as taken along the line 3–3 of FIGURE 2.

The invention is shown as applied to a conduit box 10 of a type particularly directed to electrical switches. It will be understood, however, that any other type of conduit box, such as a concrete ring, outlet box, or one upon which a receptacle or fixture is mounted, may be provided with this invention.

Box 10 is generally formed of steel. It is purely conventional having sides and a back, the front thereof being open. Usually a knock out plug 11 is disposed as desired. Generally there is more than one such knock out plug, it being intended that a conduit be received therethrough. Other conventional portions of such a conduit box have been omitted since they do not relate to this invention. However, there is shown holes 12 for the conventional purpose of having nails or studs driven therethrough when it is desired to connect the conduit box to adjacent framework.

Conduit box 10 is provided with conventional ears or lugs 13 which are formed with threaded screw receiving holes or openings 14. An accessory, in this case a switch, is to be physically connected to such lugs, through said threaded openings.

To the lugs 13 is applied a deposit of our composition 15 so that it covers said lugs and fills up the openings 14. The deposit may be simply brushed or painted on the lug. On the other hand, the lug may be simply dipped into the molten composition so as to achieve the same result.

Composition 15 will harden to a soft, waxlike consistency somewhat like ordinary candle tallow. It will cover and protect the lug from contamination by plaster, which will not adhere to the composition.

Figure 4:
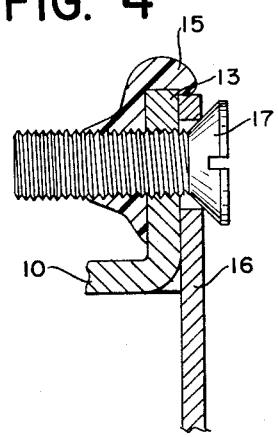
FIGURE 4 is a view similar to FIGURE 3 but illustrating the connection of an accessory such as a switch to the lugs.

When the conduit box is installed, notwithstanding any brushing of plaster against the lugs, the composition-protected lug will remain free of plaster and visible to the electrician when he comes to mount the accessory. Referring to FIGURE 4, the electrician will deposit switch 16 against the lugs 13 and will simply drive screw 17 through the opening 14 of lug 13 notwithstanding the presence of deposit 15. The deposited composition 15 will simply give way before the screw and will even facilitate its entrance by the lubricating nature thereof. In any event, the openings 14 will always be completely free of contamination. In fact, the composition 15 is of subsequent utility in that it will facilitate removal of the screw 17 as when an accessory is to be replaced.

As to the specific composition, it comprises a hot melted solution which is insoluble in aqueous media. This is of importance because plaster is wet when it is applied. The composition is formed by heating a waxlike material, a natural or synthetic resin, a fatty material together with a surface tension reducing agent, to form a tacky and adhesive cold film, when applied by dipping, pouring, with an applicator, or other means, from the hot melt solution, to the lug, the surface of which is colder than the melting point of the hot melt solution. The solution has sufficient cohesiveness when hot to cover and fill the opening in the lug to which the solution is applied. It has sufficient strength, tack, and adhesiveness when cold, to be retained on the lug but is removable and displaceable by simple penetration, although the electrician may if desired, chip it or scrape it away from the lug.

The melting point of the composition may be in the range of 118° F. to 125° F., or well above normal atmospheric temperature. The working range is in the neighborhood of from 130° F. to 180° F. in which state it may be easily deposited.

A typical formula is:

| | Parts by weight |
|---|---|
| Polyethylene glycol | 40 |
| Rosin | 50 |
| Lanolin | 8 |
| Venice turpentine | 1 |
| Color | 1 |

The materials are heated, with stirring, to 300° F. After complete solution, it may be filled into suitable containers, and will be applied at the working range temperature as above designated.

The above ingredients are all water insoluble. The principal function of the rosin is to supply tackiness and to the composition. It has been found that polyethylene glycol so modifies the tackiness as to produce the desired results. In other words, the composition must, as has been stated, adhere to the metal, resist adherence by plaster, and be readily displaceable. This is achieved by the modification of the rosin by the polyethylene glycol. In addition, the polyethylene glycol lowers the melting point of the composition. The lanolin also lowers the melting point but provides a fine control thereof. The Venice turpentine acts as a blending agent in that it is a detergent and lowers the surface tension of all the materials so as to aid in smoothly combining them. The color renders the lugs more easily locatable.

In respect to the above formula the components thereof may be substituted by ones having similar characteristics, as follows:

Polyethylene glycol:
    Cetyl alcohol and similar alcohols
    Natural waxes—carnauba, candelilla, etc.
    Insect waxes—beeswax, etc.
    Petroleum waxes—paraffin, etc.
    Microcrystalline waxes Rosin:
    Natural rosins—gum rosin, wood rosin
    Synthetic rosin—rosin esters
    Synthetic resins Lanolin:
    Animal fat, beef tallow
    Hydrogenated vegetable oils
    Petroleum hydrocarbons—petrolatum
    Blown oils
    Glycerides Venice turpentine:
    Miscellaneous surface tension reducing agents such as—
        Sulfates of higher synthetic aliphatic alcohols having from 8 to 17 carbon atoms
        Terpineol
        Soap Color: Organic dyes—sudan green It will be understood that where I have mentioned plaster herein, any like material such as concrete may be employed in certain cases. In addition, where a plaster cover is provided on the conduit box, this invention may be applied to the openings thereof.

There has been shown what is now considered a preferred embodiment of the invention but it is obvious that changes and omissions may be made without departing from its spirit. For example, the composition is also applicable to external threads on studs or the like used in conduit boxes, the composition also preventing contamination of such external threads, while being displaceable by a complementarily threaded member while being connected thereto.

What is claimed is:

1. The combination with an internally threaded metal member, of a water insoluble, soft waxlike thermoplastic mass coating the threaded portion of said member to prevent the adherence of plaster thereto, said mass comprising rosin, a normally solid polyethylene glycol having a lower melting point than said rosin, lanolin, and a surface tension reducing agent, said mass having a consistency permitting the threaded interengagement of a companion threaded element with said threaded metal member.

2. A composition for use in the protection of internally threaded metal elements against contamination, said composition comprising rosin, a normally solid polyethylene glycol having a lower melting point than said rosin, lanolin, and a surface tension reducing agent, said composition having a soft waxlike consistency.

References Cited in the file of this patent

UNITED STATES PATENTS

| 967,404 | Marshall | Aug. 16, 1910 |
| 2,122,543 | Tomsicek et al. | July 5, 1938 |
| 2,537,108 | Wagner et al. | Jan. 9, 1951 |
| 2,775,917 | Ferguson | Jan. 1, 1957 |
| 3,001,663 | Takvorian et al. | Sept. 26, 1961 |
| 3,022,197 | Jedlicka | Feb. 20, 1962 |

OTHER REFERENCES

"Industry and Societies," Products Engineering, March 1944, p. 204.

Hopkins; "The Scientific American Cyclopedia of Formulas," New York, Scientific American Publishing Co., 1923, pp. 927, 928. T 49 H8 1923.